US012809687B2

(12) United States Patent

Yang et al.

(10) Patent No.: US 12,809,687 B2

(45) Date of Patent: Nov. 24, 2026

(54) AI COMPUTING PLATFORM, AI COMPUTING METHOD, AND AI CLOUD COMPUTING SYSTEM

(71) Applicant: MONTAGE TECHNOLOGY CO., LTD., Shanghai (CN)

(72) Inventors: Jingzhong Yang, Shanghai (CN); Gang Shan, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 614 days.

(21) Appl. No.: 18/127,105

(22) Filed: Mar. 28, 2023

(65) Prior Publication Data

US 2023/0315533 A1 Oct. 5, 2023

(30) Foreign Application Priority Data

Apr. 1, 2022 (CN) ......................... 202210349300.5

(51) Int. Cl.
*G06F 9/50* (2006.01)

(52) U.S. Cl.
CPC .......... *G06F 9/5066* (2013.01); *G06F 9/5072* (2013.01)

(58) Field of Classification Search
CPC .... G06F 9/5066; G06F 9/5072; G06F 9/5044; G06F 2209/5017; G06F 2209/509; G06F 9/5061; G06F 9/5016; G06N 20/00; H04L 41/12
See application file for complete search history.

(56) References Cited

U.S. PATENT DOCUMENTS

| | | | | |
|---|---|---|---|---|
| 11,119,754 B1 * | 9/2021 | Sun | G06F 8/65 |
| 2020/0242459 A1 * | 7/2020 | Manipatruni | G06N 3/0464 |
| 2021/0021522 A1 * | 1/2021 | Labonté | H04L 47/15 |
| 2021/0295145 A1 * | 9/2021 | Bayat | G06N 3/0464 |
| 2023/0124520 A1 * | 4/2023 | Zhong | G06F 9/5066 712/220 |

(Continued)

FOREIGN PATENT DOCUMENTS

| | | |
|---|---|---|
| CN | 105007200 A | 10/2015 |
| CN | 112463709 A | 3/2021 |

OTHER PUBLICATIONS

Mar. 20, 2026 Office Action issued in Chinese Patent Application No. 202210349300.5.

*Primary Examiner* — April Y Blair
*Assistant Examiner* — Hsing Chun Lin
(74) *Attorney, Agent, or Firm* — Oliff PLC

(57) ABSTRACT

An AI computing platform, an AI computing method, and an AI cloud computing system, the platform including: at least one computing component, each computing component includes: a processor, configured to initiate a calculation task and decompose the calculation task into a plurality of ordered subtasks according to a network topology information table stored therein; a plurality of near-memory computing modules, the plurality of near-memory computing modules connecting in pairs with the processor, and the plurality of near-memory computing modules connecting in pairs with each other, wherein the plurality of near-memory computing modules are each configured to implement different operation types, and the plurality of near-memory computing modules complete one or more of the plurality of subtasks according to the operation types they each implement.

12 Claims, 4 Drawing Sheets

(56) References Cited

U.S. PATENT DOCUMENTS

| | | | | |
|---|---|---|---|---|
| 2023/0266996 | A1* | 8/2023 | Reddy .................. | G06F 9/5038<br>718/105 |
| 2025/0156356 | A1* | 5/2025 | Paul ..................... | G06F 3/0688 |

* cited by examiner

AI COMPUTING PLATFORM, AI COMPUTING METHOD, AND AI CLOUD COMPUTING SYSTEM

REFERENCE TO RELATED APPLICATION

This application claims priority to Chinese Application number CN2022103493005, filed on Apr. 1, 2022, the contents of which are incorporated herein by reference.

TECHNICAL FIELD

This application relates to the field of artificial intelligence computing technology, in particular to an AI computing platform, an AI computing method, and an AI cloud computing system.

BACKGROUND

In the prior art, when a single server including a plurality of AI computing modules handles complex tasks, a conventional approach is as shown in FIG. 1, where a CPU performs centralized scheduling of resources in its corresponding NCMs (Near-memory computing modules), and data interaction between the NCMs is forwarded through the CPU. This architecture makes the CPU easily become a bottleneck of processing capability and interface communication capability. When application scenario is extended to a more complex multi-server or cloud computing scenarios, due to the existence of the above bottleneck, the processing resources are limited and cannot be flexibly deployed in the cloud, and the portability and scalability are poor, which cannot achieve efficient computing and is not conducive to efficient application in complex computing scenarios.

SUMMARY OF THE INVENTION

Embodiments of the present application provide an AI computing platform, an AI computing method, and AI cloud computing system, which give full play to the advantages of segmented computing, reduce unified scheduling load of the processor, have good versatility and scalability, and can be applied to single-server, multi-server and cloud scenarios.

This application discloses an AI computing platform, the platform includes: at least one computing component, each computing component includes:

- a processor, configured to initiate a calculation task and decompose the calculation task into a plurality of ordered subtasks according to a network topology information table stored therein; and
- a plurality of near-memory computing modules, the plurality of near-memory computing modules connecting in pairs with the processor, and the plurality of near-memory computing modules connecting in pairs with each other, wherein the plurality of near-memory computing modules are each configured to implement different operation types, and the plurality of near-memory computing modules complete one or more of the plurality of subtasks according to the operation types they each implement.

In one embodiment, the network topology information table comprises: an IP address of a host where the processor is located, a near-memory computing module index, operation type(s) supported by the near-memory computing module, a load rate, number of adjacent near-memory computing modules, and operation types supported by the adjacent near-memory computing modules.

In one embodiment, the processor is further configured to generate a package according to the decomposed plurality of ordered subtasks, and transmit the package to a near-memory computing module that processes the first subtask, wherein the package comprises: number of near-memory computing modules required to process the package, a list of near-memory computing modules required to process the package, a header cyclic redundancy check, a payload length, and a payload.

In one embodiment, the near-memory computing module is further configured to process a corresponding subtask when receiving the package and generate a processed package, and transmit the processed package to a next near-memory computing module according to the list of near-memory computing modules or return the processed package to the processor.

In one embodiment, the list of near-memory computing module comprises an IP address of a host located, an index, operation type(s) supported, and a load rate of the near-memory computing module sequentially processing each subtask.

In one embodiment, the processor is further configured to implement operation type(s) different from the plurality of near-memory computing modules, wherein the processor and the plurality of near-memory computing modules complete one or more of the plurality of subtasks according to the operation types they each implement.

In one embodiment, the processors of each computing component may be connected via a bus.

This application also discloses an AI computing method, the method includes:

- initiating, by a processor, a calculation task and decomposing the calculation task into a plurality of ordered subtasks according to a network topology information table stored therein;
- generating, by the processor, a package according to the decomposed plurality of ordered subtasks, and routing the package to a near-memory computing module that processes the first subtask;
- processing, by the near-memory computing modules, a corresponding subtask when receiving the package to generate a processed package, and transmitting the processed package to a next near-memory computing module that processes a next subtask until completing all the subtasks, and then routing to the processor connecting to the near-memory computing module that processes the last subtask.

In one embodiment, the plurality of near-memory computing modules connect in pairs with the processor, and the plurality of near-memory computing modules connect in pairs with each other, wherein the plurality of near-memory computing modules are each configured to implement different operation types.

In one embodiment, the network topology information table comprises: an IP address of a host where the processor is located, a near-memory computing module index, operation type(s) supported by the near-memory computing module, a load rate, number of adjacent near-memory computing modules, and operation types supported by the adjacent near-memory computing modules.

In one embodiment, the package comprises: number of near-memory computing modules required to process the package, a list of near-memory computing modules required to process the package, a header cyclic redundancy check, a payload length, and a payload.

In one embodiment, the list of near-memory computing module comprises an IP address of a host located, an index, operation type(s) supported, and a load rate of the near-memory computing module sequentially processing each subtask.

In one embodiment, the processor is further configured to implement operation type(s) different from the plurality of near-memory computing modules, wherein the processor and the plurality of near-memory computing modules complete one or more of the plurality of subtasks according to the operation types they each implement.

The present application also discloses an AI cloud computing system, the system includes: a cloud computing center, and a plurality of the AI computing platform, where the cloud computing center is connected to the plurality of AI computing platforms;

the AI computing platform comprises at least one computing component each comprising:

a processor, configured to initiate a calculation task and decompose the calculation task into a plurality of ordered subtasks according to a network topology information table stored therein;

a plurality of near-memory computing modules, the plurality of near-memory computing modules connecting in pairs with the processor, and the plurality of near-memory computing modules connecting in pairs with each other, wherein the plurality of near-memory computing modules are each configured to implement different operation types, and the plurality of near-memory computing modules complete one or more of the plurality of subtasks according to the operation types they each implement.

In one embodiment, the network topology information table comprises: an IP address of a host where the processor is located, a near-memory computing module index, operation type(s) supported by the near-memory computing module, a load rate, number of adjacent near-memory computing modules, and operation types supported by the adjacent near-memory computing modules.

In one embodiment, the processor is further configured to generate a package according to the decomposed plurality of ordered subtasks, and transmit the package to a near-memory computing module that processes the first subtask, wherein the package comprises: number of near-memory computing modules required to process the package, a list of near-memory computing modules required to process the package, a header cyclic redundancy check, a payload length, and a payload.

In one embodiment, the near-memory computing module is further configured to process a corresponding subtask when receiving the package and generate a processed package, and transmit the processed package to a next near-memory computing module according to the list of near-memory computing modules or return the processed package to the processor.

In one embodiment, the list of near-memory computing module comprises an IP address of a host located, an index, operation type(s) supported, and a load rate of the near-memory computing module sequentially processing each subtask.

In one embodiment, the processor is further configured to implement operation type(s) different from the plurality of near-memory computing modules, wherein the processor and the plurality of near-memory computing modules complete one or more of the plurality of subtasks according to the operation types they each implement.

In one embodiment, the processors of each computing component may be connected via a bus.

BRIEF DESCRIPTION OF THE FIGURES

Embodiments of the present application will be described in even greater detail below based on the exemplary figures. The present application is not limited to the exemplary embodiments. All features described and/or illustrated herein can be used alone or combined in different combinations in embodiments of the present application. The features and advantages of various embodiments of the present application will become apparent by reading the following detailed description with reference to the attached drawings which illustrate the following.

DETAILED DESCRIPTION

Figure 1:
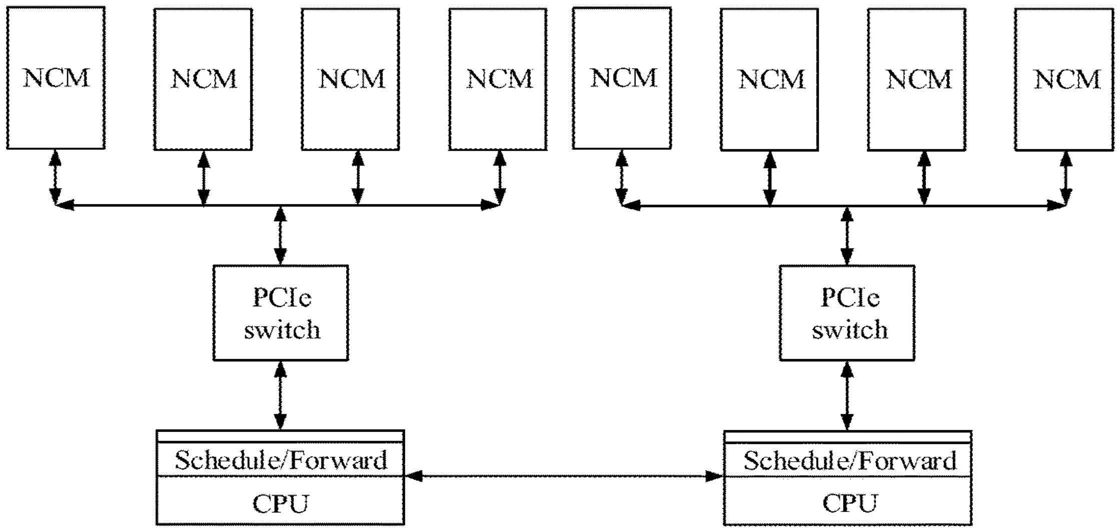
FIG. 1 is a schematic diagram of a computing server in the prior art.

In the implementation of an embodiment of the present application, the processor decomposes a calculation task into a plurality of ordered subtasks based on a network topology information table, and generates a package based on the near-memory segmented computing protocol (SC4NCM). When receiving the package, each near-memory computing module processes the corresponding subtask according to the operation type that it can perform. This application reduces unified scheduling load of the processor while giving full play to the advantages of segmented computing, and has good generality and scalability, so it can be applied to single-server, multi-server and cloud scenarios at the same time, and provides an efficient cloud-native computing platform architecture for AI servers to deploy cloud-native applications. In addition, because SC4NCM protocol package can flexibly define various computing functions, they can also be applied to computing modules such as GPGPU and FPGA, and can be extended to more complex computing applications such as machine training.

A large number of technical features are described in the specification of the present application, and are distributed in various technical solutions. If a combination (i.e., a technical solution) of all possible technical features of the present application is listed, the description may be made too long. In order to avoid this problem, the various technical features disclosed in the above summary of the present application, the technical features disclosed in the various embodiments and examples below, and the various technical features disclosed in the drawings can be freely combined with each other to constitute various new technical solutions (all of which are considered to have been described in this specification), unless a combination of such technical features is not technically feasible. For example, feature A+B+C is disclosed in one example, and feature A+B+D+E is disclosed in another example, while features C and D are equivalent technical means that perform the same function, and technically only choose one, not to adopt at the same time. Feature E can be combined with feature C technically. Then, the A+B+C+D scheme should not be regarded as already recorded because of the technical infeasibility, and A+B+C+E scheme should be considered as already documented.

In the following description, numerous technical details are set forth in order to provide the readers with a better understanding of the present application. However, those skilled in the art can understand that the technical solutions claimed in the present application can be implemented without these technical details and various changes and modifications based on the following embodiments.

In order to make the objects, technical solutions and advantages of the present application more clear, embodiments of the present application will be further described in detail below with reference to the accompanying drawings.

An embodiment of the present application provides an AI computing platform. The AI computing platform includes at least one computing component. Each computing component includes a processor and a plurality of near-memory computing modules. The plurality of near-memory computing modules are connected to the processor in pairs (that is, each of the plurality of near-memory computing modules is connected to the processor), and the plurality of near-memory computing modules are connected to each other in pairs. The processor is configured to initiate a calculation task and decompose the calculation task into a plurality of ordered subtasks according to a network topology information table stored therein. The plurality of near-memory computing modules are each configured to implement different operation types, and the plurality of near-memory computing modules complete one or more of the plurality of subtasks according to the operation types they each implement.

In one embodiment, the computing module of the AI computing platform includes a near-memory computing module NCM which is an implementation manner of AI chip. In other embodiments, the computing module of the AI computing platform may also include computing modules such as GPGPU and FPGA, which are suitable for more complex computing applications such as machine training.

Figure 2:
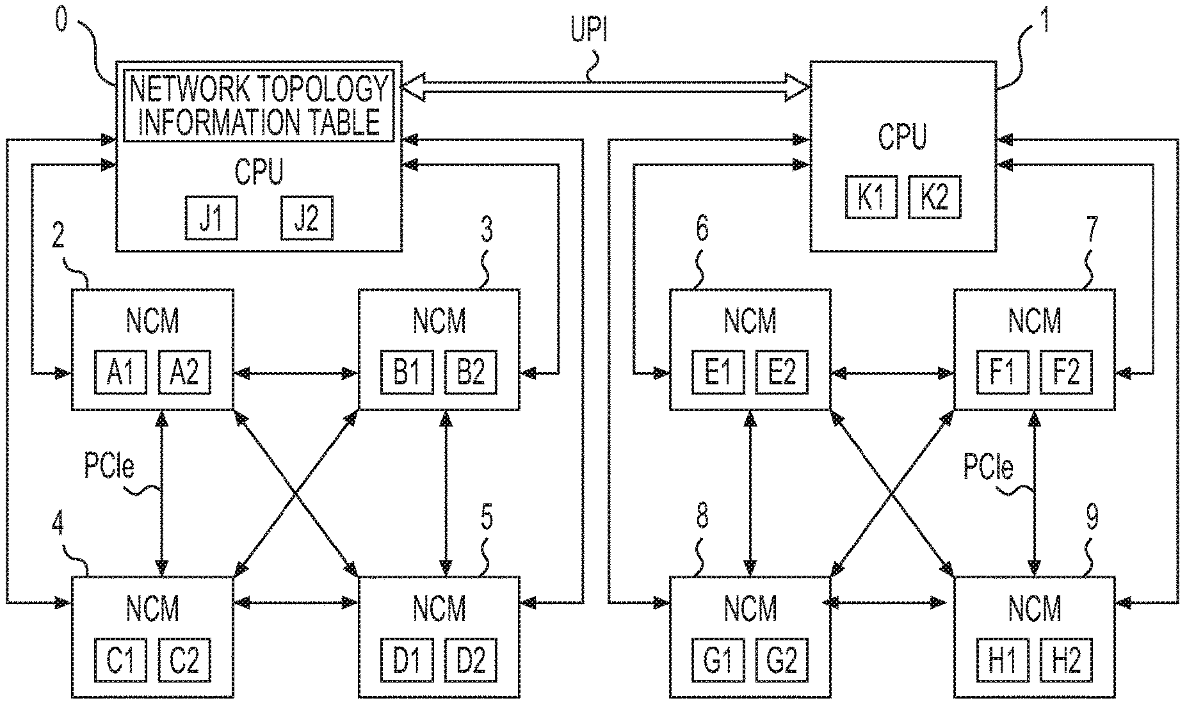
FIG. 2 is a schematic structural diagram of an AI computing platform according to an embodiment of the present application.

As shown in FIG. 2, as an example, the AI computing platform consists of two computing components, each of which includes one processor and four near-memory computing modules. It should be noted that the number of computing components included in the AI computing platform and the number of near-memory computing modules included in each computing component can be set according to actual needs, which are not limited in this embodiment. As shown in FIG. 2, in each computing component, the four near-memory computing modules are connected to the processor in pairs, and the four near-memory computing modules are connected to each other in pairs. The processor and the four near-memory computing modules may be connected to each other via PCIe. In one embodiment, the processors of each computing component may be connected to each other via a bus. For example, the two processors in FIG. 2 are connected via UPI (Ultra path interconnect) bus. In one embodiment, the processor and the near-memory computing modules may be configured to implement different operation types. For example, in FIG. 2, the processor ⓪ may implement the logical operations J1 and J2, the processor ① may implement the logical operations K1 and K2, the near-memory computing module ② may implement the logical operations A1 and A2, and the near-memory computing module ③ may implement the logical operations B1 and B2, the near-memory computing module ④ may implement the logical operations C1 and C2, the near-memory computing module ⑤ may implement the logical operations D1 and D2, the near-memory computing module ⑥ may implement the logical operations E1 and E2, the near-memory computing module ⑦ may implement the logical operations F1 and F2, the near-memory computing module ⑧ may implement the logical operations G1 and G2, the near-memory computing module ⑨ may implement the logical operations H1 and H2, etc. It should be understood that the operation types implemented by the processor and the near-memory computing modules can be set according to actual needs, which are not limited in this embodiment.

The network topology information table is stored in the processor ⓪ in FIG. 2. In one embodiment, the network topology information table includes an IP address of a host where the processor is located, a near-memory computing module index, operation (OP) type(s) supported by the near-memory computing module, a load rate (overload) of the near-memory computing module, number of adjacent near-memory computing modules, and operation types supported by the adjacent near-memory computing modules. Table 1 shows an example of the network topology information table.

TABLE 1

Network topology information table

| IP address | NCM index | OP types | Overload | Number of adjacent NCMs | OP types supported by adjacent NCMs |
|---|---|---|---|---|---|
| 10.121.121.1 | 0 | J1, J2 | 0% | 1 | K1, K2 |
| 10.121.121.1 | 0 | J1, J2 | 0% | 2 | A1, A2 |
| 10.121.121.1 | 0 | J1, J2 | 0% | 3 | B1, B2 |
| 10.121.121.1 | 0 | J1, J2 | 0% | 4 | C1, C2 |
| 10.121.121.1 | 0 | J1, J2 | 0% | 5 | C1, C2 |
| 10.121.121.1 | 2 | A1, A2 | 0% | 3 | B1, B2 |
| 10.121.121.1 | 2 | A1, A2 | 0% | 4 | C1, C2 |
| 10.121.121.1 | 2 | A1, A2 | 0% | 5 | C1, C2 |
| 10.121.121.1 | 2 | A1, A2 | 0% | 0 | J1, J2 |
| | | | . . . | | |

Figure 3:
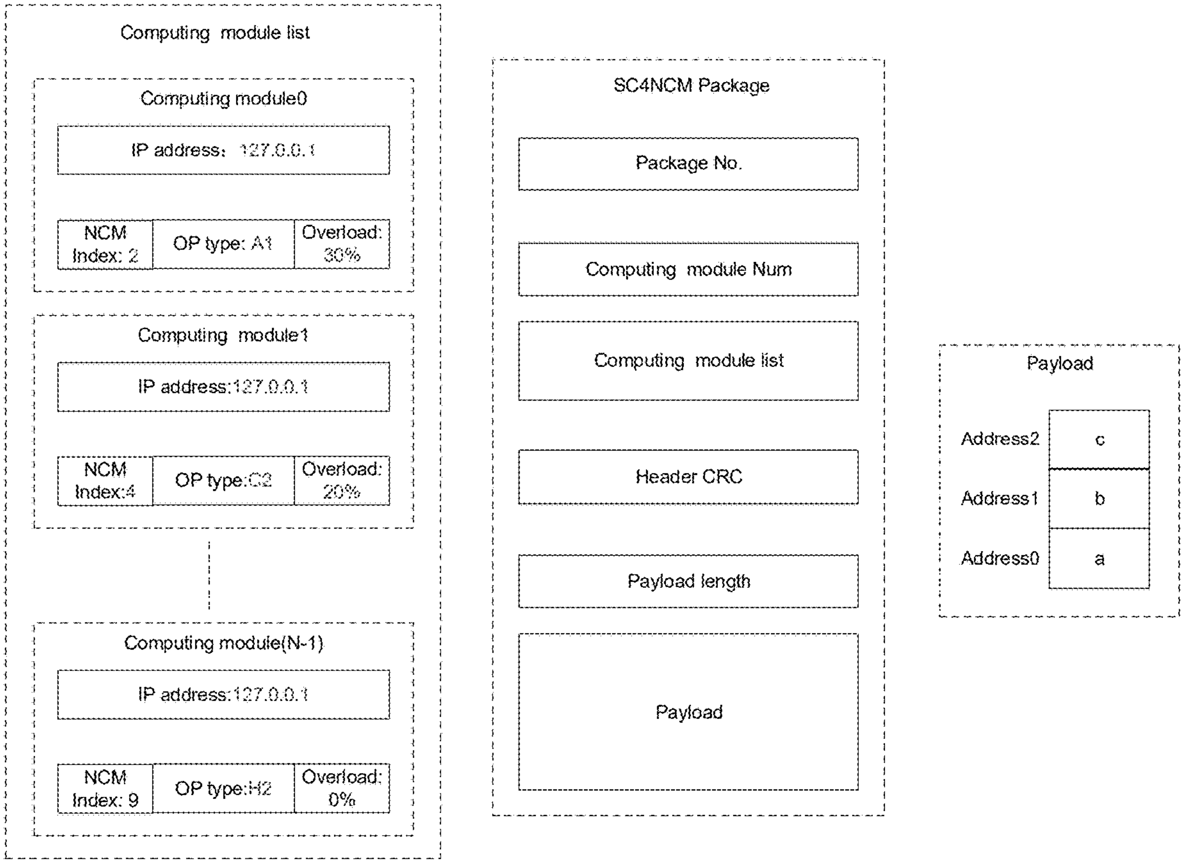
FIG. 3 is a schematic diagram of a package according to an embodiment of the present application.

In one embodiment, the processor decomposes the calculation task into a plurality of ordered subtasks according to the network topology information (i.e., while decomposing the calculation task into a plurality of subtasks, it also generates a processing order of each subtask), generates a package, and transmits the package to a near-memory computing module that processes the first subtask according to the processing order of the subtasks. When the near-memory computing module receives the package, it processes the corresponding subtask to generate the processed package, and transmits the processed package to the near-memory computing module that processes the next subtask, and so on. When all the subtasks are completed, the near-memory computing module that processes the last subtask returns the processed package to the processor. As shown in FIG. 3, in one embodiment, the package may include number of the near-memory computing modules required to process the package, a list of near-memory computing modules required to process the package, a packet header cyclic redundancy check (CRC), a payload length, and a payload. In another embodiment, the package may further includes a package number (package No.). The package number is mainly used to indicate the processing order of package and ensure the reliability of package transmission. The list of near-memory computing modules required to process the packet includes details of each near-memory computing module, which can be found below. The packet header cyclic redundancy check ensures that data communication is correct. The payload length is the length of the payload to be processed by the near-memory calculation module, and each near-memory calculation module refreshes the payload length after processing the corresponding operation. The payload may comprise a with address0, b with address1, and c with address2.

As shown in FIG. 2, for example, the processor ⓪ decomposes the calculation task into a plurality of subtasks. The subtasks are performing the following operations on corresponding data: A1, C2, B1, J1, K2, E1, and H2, and the subtasks are completed sequentially. The processor then determines the near-memory computing module that completes each of the above subtasks based on the network topology information table, and generates the list of near-memory computing modules. In an embodiment, the list of near-memory computing modules includes an IP address of host where the near-memory computing module that sequentially processes each subtask is located, an index of the near-memory computing module that sequentially processes each subtask, operation type(s) supported by the near-memory computing module that sequentially processes each subtask, and a load rate of the near-memory computing module that sequentially processes each subtask. After processing the corresponding subtask and generating the processed package, the near-memory computing module then determines a near-memory computing module to process the next subtask according to the list of near-memory computing modules. Table 2 below shows a list of near-memory computing modules in one embodiment.

TABLE 2

List of near-memory computing modules

| IP address | NCM index | OP type | Overload |
|---|---|---|---|
| 127.0.0.1 | 2 | A1 | 30% |
| 127.0.0.1 | 4 | C2 | 20% |
| 127.0.0.1 | 3 | B1 | 30% |
| 127.0.0.1 | 0 | J1 | 20% |
| 127.0.0.1 | 1 | K2 | 30% |
| 127.0.0.1 | 6 | E1 | 20% |
| 127.0.0.1 | 9 | H2 | 0% |

In one embodiment, the processor does not specifically involve in the processing of subtasks, but only the near-memory computing modules process the subtasks. In another embodiment, the processor may also involve in the processing of subtasks after initiating the calculation task, i.e., the processor and the near-memory computing modules together process the subtasks. In this case, the processor may be configured to implement different operation type(s) from the plurality of near-memory computing modules. Wherein, the processor and several near-memory computing modules complete one or more of the plurality of subtasks according to the operation types they each implement. It should be noted that the use of the processor for implementing the operation type is optional.

Figure 4:
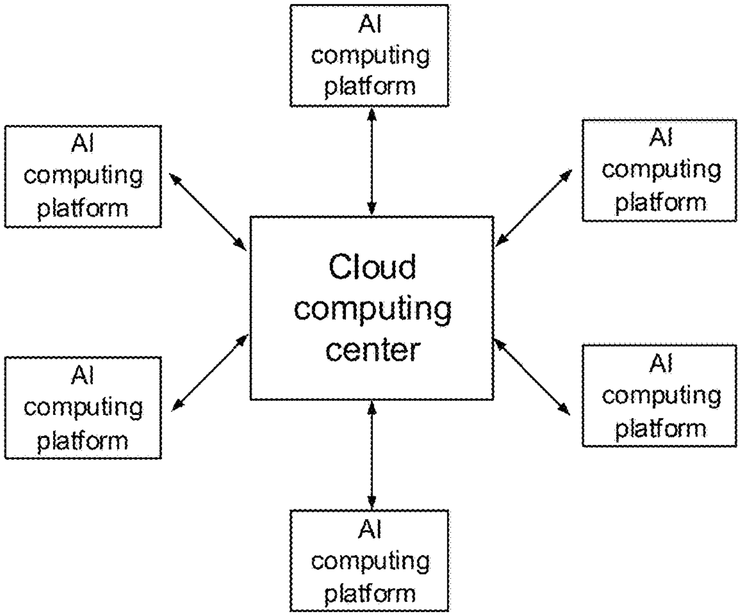
FIG. 4 is a schematic structural diagram of an AI cloud computing system according to an embodiment of the present application.

Another embodiment of the present application discloses an AI cloud computing system, as shown in FIG. 4. The AI cloud computing system comprises: a cloud computing center, and a plurality of AI computing platforms, and the cloud computing center is connected to the plurality of AI computing platforms. The structure of the AI computing platform is as described above, and details are not described in this embodiment.

In the embodiment of the present application, all the computing resources of the cloud computing system composed of the scheduled computing module in the application are maintained as a network topology information table in the form of "edge" (point-to-point connection), which is used when the processor initiates the calculation task to decompose the calculation task into subtasks.

Figure 5:
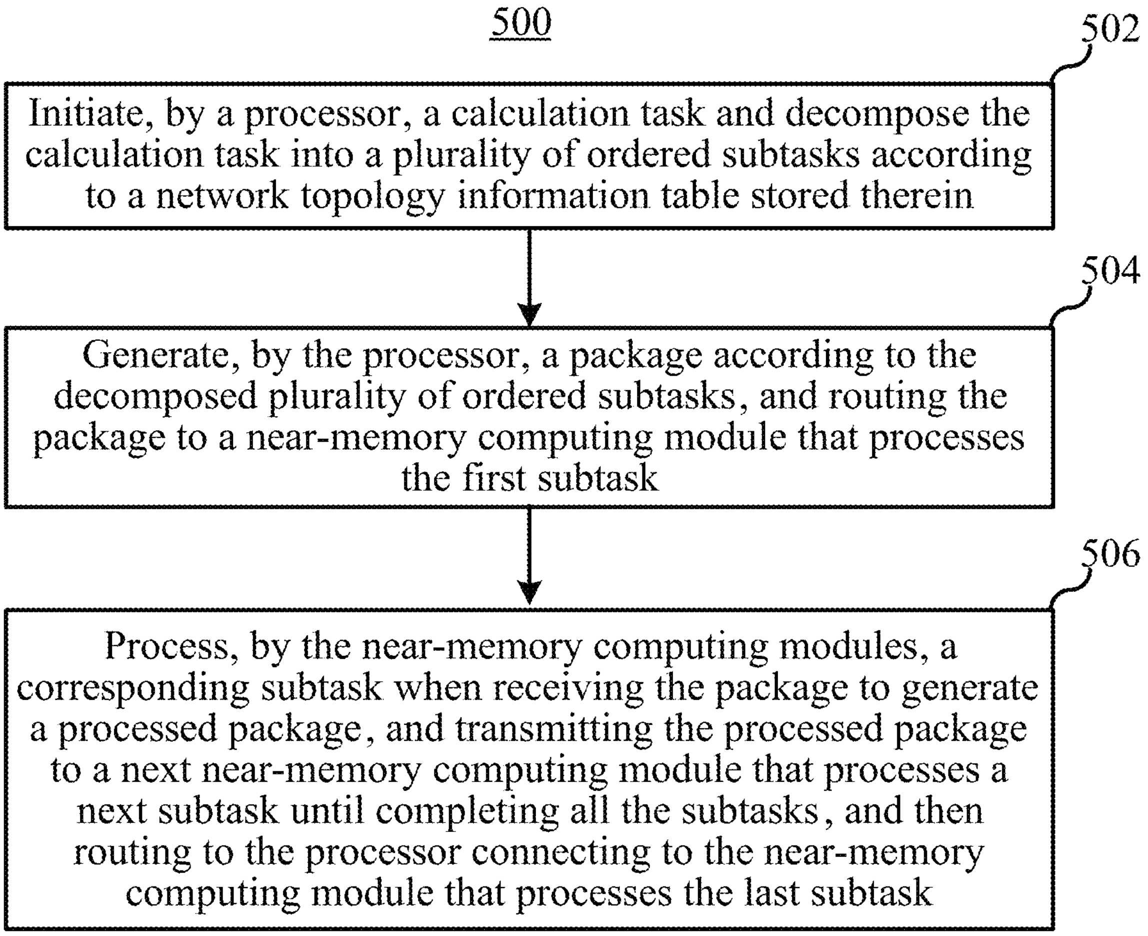
FIG. 5 is a flowchart of an AI computing method according to an embodiment of the present application.

Another embodiment of the present application discloses an AI computing method, and FIG. 5 shows a flowchart of an AI computing method 500 in an embodiment. The method 500 includes the following steps:

In step 502, a processor initiates a calculation task and decomposes the calculation task into a plurality of ordered subtasks according to a network topology information table stored therein. The network topology information table includes: an IP address of a host where the processor is located, a near-memory computing module index, operation type(s) supported by the near-memory computing module, a load rate, number of adjacent near-memory computing modules, and operation types supported by the adjacent near-memory computing modules.

In step 504, the processor generates a package according to the decomposed plurality of ordered subtasks and routes the package to a near-memory computing module that processes the first subtask according to the processing order of the subtasks.

The plurality of near-memory computing modules are connected to the processor in pairs (that is, each of the plurality of near-memory computing modules is connected to the processor), and the plurality of near-memory computing modules are connected to each other in pairs, wherein the plurality of near-memory computing modules are each configured to implement different operation types.

In one embodiment, a package may include number of near-memory computing modules required to process the package, a list of near-memory computing modules required to process the package, a packet header cyclic redundancy check, a payload length, and a payload. In another embodiment, the package may further include a package number. In an embodiment, the list of near-memory computing modules includes an IP address of a host located, an index, operation type(s) supported, and a load rate of the near-memory computing module that sequentially processes each subtask.

In step 506, the near-memory computing module processes a corresponding subtask when receiving the package to generate a processed package, and routes the processed package to the near-memory computing module that processes the next subtask until all the subtasks are completed, and then routes to a processor connected to the near-memory computing module that processes the last subtask.

In addition, the processor may be further configured to implement operation type(s) different from the plurality of near-memory computing modules, wherein the processor and the plurality of near-memory computing modules complete one or more of the plurality of subtasks according to the operation types they each implement. That is, the processor can also participate in the processing of subtasks like the near-memory computing modules.

It should be noted that the package mentioned in this application is defined based on the near-memory segment calculation protocol (SC4NCM), that is, it is SC4NCM package.

Figure 6:
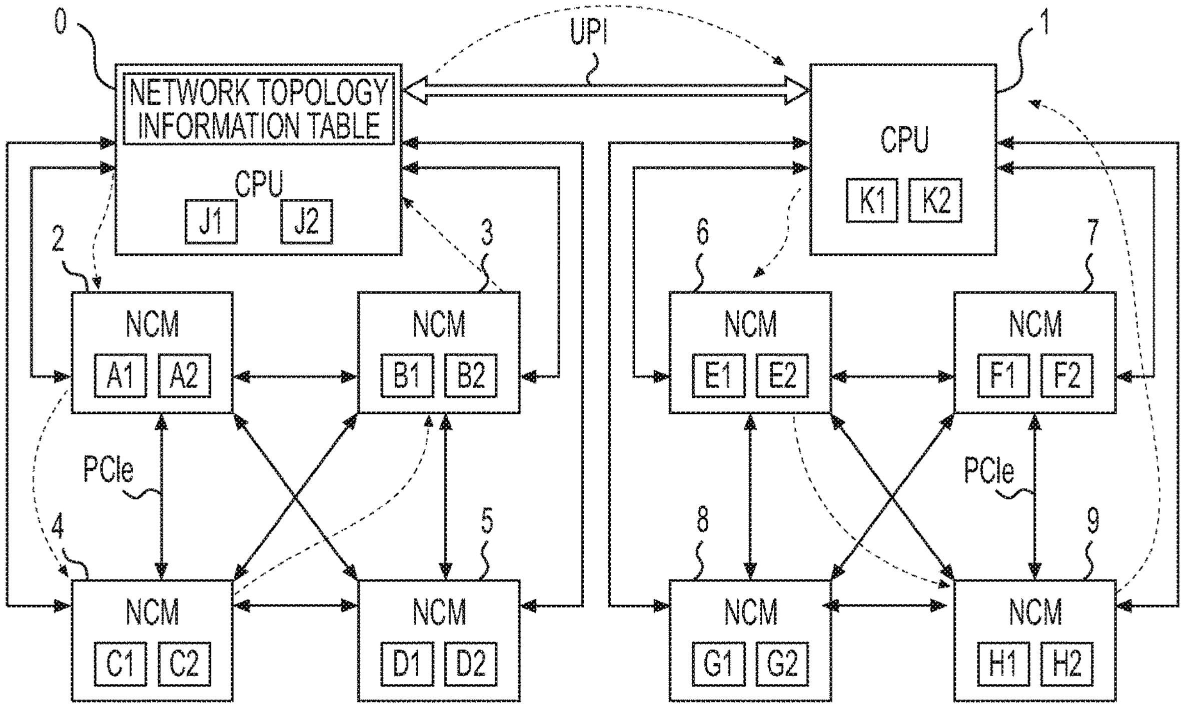
FIG. 6 is a flowchart of the completion of a calculation task according to an embodiment of the present application.

In an example of a stand-alone multi-card environment, FIG. 6 is a flowchart of calculation task processing based on the embodiment of this application, and the task processing flow is as follows:

(1) The CPU initiates the calculation task and reasonably decomposes the calculation task into a plurality of ordered subtasks according to the network topology information table. For example, the plurality of ordered subtasks are processed in the following order: A1→C2→B1→J1→K2→E1→H2.

(2) The CPU forms SC4NCM packet according to the decomposed plurality of ordered subtasks and routes it to the initial node (i.e., the near-memory computing module that processes the first subtask).

(3) The node (near-memory computing module or CPU that processes subtasks) completes the corresponding segment calculation according to the OP type in the SC4NCM packet protocol, generates the processed SC4NCM packet and routes it to the next node. The segmented computing mentioned in the embodiment of this application is a type of distributed computing.

(4) Repeating step (3) until all calculation subtasks are processed and the finally generated SC4NCM package is returned to the processor, the data path is shown as the curve in FIG. 6.

Similarly, the protocol can also be used in multi-server or cloud server scenarios, with good versatility and scalability.

It should be noted that in this specification of the application, relational terms such as the first and second, and so on are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises a multiple elements includes not only those elements but also other elements, or elements that are inherent to such a process, method, item, or device. Without more restrictions, the element defined by the phrase "comprise(s) a/an" does not exclude that there are other identical elements in the process, method, item or device that includes the element. In this specification of the application, if it is mentioned that an action is performed according to an element, it means the meaning of performing the action at least according to the element, and includes two cases: the action is performed only on the basis of the element, and the action is performed based on the element and other elements. Multiple, repeatedly, various, etc., expressions include 2, twice, 2 types, and 2 or more, twice or more, and 2 types or more types.

All documents mentioned in this specification are considered to be included in the disclosure of this application as a whole, so that they can be used as a basis for modification when necessary. In addition, it should be understood that the above descriptions are only preferred embodiments of this specification, and are not intended to limit the protection scope of this specification. Any modification, equivalent replacement, improvement, etc. made within the spirit and principle of one or more embodiments of this specification should be included in the protection scope of one or more embodiments of this specification.

In some cases, the actions or steps described in the claims can be performed in a different order than in the embodiments and still achieve desired results. In addition, the processes depicted in the drawings do not necessarily require the specific order or sequential order shown in order to achieve the desired results. In some embodiments, multitasking and parallel processing are also possible or may be advantageous

What is claimed is:

1. An AI computing platform, comprising at least one computing component, each computing component comprising:

a processor, configured to:

initiate a calculation task and decompose the calculation task into a plurality of ordered subtasks according to a network topology information table stored in the processor, and generate a package based on the plurality of ordered subtasks, the package comprising an IP address of a host on which each near-memory computing module that sequentially processes each subtask is located, an index, one or more operation types supported for each near-memory computing module, and a load rate of each near-memory computing module sequentially processing each subtask; and a plurality of near-memory computing modules, the plurality of near-memory computing modules connecting in pairs with the processor, and the plurality of near-memory computing modules connecting in pairs with each other, wherein the plurality of near-memory computing modules are each configured to:

implement different operation types, the plurality of near-memory computing modules being configured to complete one or more of the plurality of ordered subtasks according to respective operation types of the different operation types that the plurality of near-memory computing modules are configured to implement, wherein a first near-memory computing module of the plurality of near-memory computing modules is configured to:

receive the package from the processor, process a first subtask of the plurality of ordered subtasks, the first subtask matching an operation type of the one or more operation types supported by the first near-memory computing module to generate a first processed package, and transmit the first processed package directly to a second near-memory computing module of the plurality of near memory computing modules; and the second near-memory computing module is configured to:

receive the first processed package from the first near-memory computing module, process a second subtask of the plurality of ordered subtasks, the second subtask matching an operation type of the one or more operation types supported by the second near-memory computing module, to generate a second processed package, and transmit the second processed package directly to either (i) a subsequent near-memory computing module of the plurality of near-memory computing modules, or (ii) the processor after the second subtask is a last subtask of the plurality of ordered subtasks.

2. The AI computing platform according to claim 1, wherein the network topology information table further comprises: an IP address of a host where the processor is located, the index, the one or more operation types supported for each near-memory computing module, the load rate, a number of adjacent near-memory computing modules, and operation types supported by the adjacent near-memory computing modules.

3. The AI computing platform according to claim 1, wherein the processor is further configured to transmit the package to the first near-memory computing module, wherein the package further comprises: a number of near-memory computing modules required to process the package, a list of near-memory computing modules required to process the package, a header cyclic redundancy check, a payload length, and a payload.

4. The AI computing platform according to claim 3, wherein the second near-memory computing module is further configured to transmit the second processed package to the subsequent near-memory computing module according to the list of near-memory computing modules.

5. The AI computing platform according to claim 1, wherein the processor is further configured to implement one or more operation types different from the plurality of near-memory computing modules, wherein the processor and the plurality of near-memory computing modules complete one or more of the plurality of ordered subtasks according to operation types the processor and the plurality of near-memory computing modules each implement.

6. The AI computing platform according to claim 1, wherein the at least one computing component comprises a plurality of computing components, and the processors of each computing component of the plurality of computer components are connected via a bus.

7. An AI computing method, comprising:

initiating, by a processor, a calculation task and decomposing the calculation task into a plurality of ordered subtasks according to a network topology information table stored in the processor;

generating, by the processor, a package according to the plurality of ordered subtasks, and routing the package to a first near-memory computing module of a plurality of near-memory computing modules implementing different operation types, the package comprising an IP address of a host on which each near-memory computing module that sequentially processes each subtask is located, an index, one or more operation types supported for each near-memory computing module, and a load rate of each near-memory computing module sequentially processing each subtask;

processing, by the first near-memory computing module, a first subtask of the plurality of ordered subtasks, the first subtask matching an operation type of the one or more operation types supported by the first near-memory computing module, to generate a first processed package, and transmitting the first processed package directly to a second near-memory computing module of the plurality of near-memory computing modules; and processing, by the second near-memory computing module, a second subtask of the plurality of ordered subtasks, the second subtask matching an operation type of the one or more operation types supported by the second near-memory computing module, to generate a second processed package, and transmitting the second processed package directly to either (i) a subsequent near-memory computing module of the plurality of near-memory computing modules, or (ii) the processor after the second subtask is a last subtask of the plurality of ordered subtasks.

8. The AI computing method according to claim 7, wherein the plurality of near-memory computing modules connect in pairs with the processor, and the plurality of near-memory computing modules connect in pairs with each other.

9. The AI computing method according to claim 7, wherein the network topology information table further comprises: an IP address of a host where the processor is located, the index, the one or more operation types supported for each near-memory computing module, the load rate, a number of adjacent near-memory computing modules, and operation types supported by the adjacent near-memory computing modules.

10. The AI computing method according to claim 7, wherein the package further comprises: a number of near-memory computing modules required to process the package, a list of near-memory computing modules required to process the package, a header cyclic redundancy check, a payload length, and a payload.

11. The AI computing method according to claim 7, wherein the processor is further configured to implement one or more operation types different from the plurality of near-memory computing modules, wherein the processor and the plurality of near-memory computing modules complete one or more of the plurality of ordered subtasks according to operation types the processor and the plurality of near-memory computing modules each implement.

12. An AI cloud computing system, comprising: a cloud computing center, and a plurality of AI computing platforms, wherein the cloud computing center is connected to the plurality of AI computing platforms;

each AI computing platform comprises at least one computing component, each computing component comprising:

a processor, configured to:

initiate a calculation task and decompose the calculation task into a plurality of ordered subtasks according to a network topology information table stored in the processor, and generate a package based on the plurality of ordered subtasks, the package comprising an IP address of a host on which each near-memory computing module that sequentially processes each subtask is located, an index, one or more operation types supported for each near-memory computing module, and a load rate of each near-memory computing module sequentially processing each subtask; and a plurality of near-memory computing modules, the plurality of near-memory computing modules connecting in pairs with the processor, and the plurality of near-memory computing modules connecting in pairs with each other, wherein the plurality of near-memory computing modules are each configured to:

implement different operation types, the plurality of near-memory computing modules being configured to complete one or more of the plurality of ordered subtasks according to respective operation types of the different operation types that the plurality of near-memory computing modules are configured to implement, wherein a first near-memory computing module of the plurality of near-memory computing modules is configured to:

receive the package from the processor, process a first subtask of the plurality of ordered subtasks, the first subtask matching an operation type of the one or more operation types supported by the first near-memory computing module, to generate a first processed package, and transmit the first processed package directly to a second near-memory computing module of the plurality of near-memory computing modules; and the second near-memory computing module is configured to:

receive the first processed package from the first near-memory computing module, process a second subtask of the plurality of ordered subtasks, the second subtask matching an operation type of the one or more operation types supported by the second near-memory computing module, to generate a second processed package, and transmit the second processed package directly to either (i) a subsequent near-memory computing module of the plurality of near-memory computing modules, or (ii) the processor after the second subtask is a last subtask of the plurality of ordered subtasks.

* * * * *